United States Patent [19]

Kitano et al.

[11] 3,753,607
[45] Aug. 21, 1973

[54] OPTICAL IMAGE TRANSMITTING STRUCTURE

[75] Inventors: Ichiro Kitano, Higashinada-ku, Kobe-shi, Hyogo-ken; Ken Koizumi, Itami-shi, Hyogo-ken; Hiroyshi Matsumura, Higashi-ku, Osaka-shi, Osaka-fu, all of Japan

[73] Assignee: Nippon Selfoc Kabushiki Kaisha (a.k.a. Nippon Selfoc Co., Ltd.), Tokyo-to, Japan

[22] Filed: Jan. 17, 1972

[21] Appl. No.: 218,492

Related U.S. Application Data

[63] Continuation of Ser. No. 852,333, Aug. 22, 1969, abandoned.

[30] Foreign Application Priority Data

Aug. 27, 1968 Japan.................... 43/61371

[52] U.S. Cl.......................... 350/96 B, 350/175 GN
[51] Int. Cl. ............................................ G02b 5/16
[58] Field of Search........... 350/96 R, 96 B, 96 WG, 350/175 GN

[56] References Cited
UNITED STATES PATENTS

| 3,614,197 | 10/1971 | Nishizawa et al. | 350/96 WG |
| 3,481,195 | 12/1969 | Hendrickson et al. | 350/96 B X |
| 3,083,123 | 3/1963 | Navias | 350/175 GN X |
| 3,320,114 | 5/1967 | Schulz | 350/96 R X |
| 3,434,774 | 3/1969 | Miller | 350/96 WG |

OTHER PUBLICATIONS

Miller, Article in Bell System Technical Journal Vol. 44, No. 9, Nov. 1965 pgs. 2017–2030.
Kawakami et al., Article in Proceedings of the IEEE Dec. 1965, pgs. 2148 & 2149.

Primary Examiner—David H. Rubin
Attorney—Robert E. Burns et al.

[57] ABSTRACT

An optical image transmitting device capable of transmitting an image of an object to a plurality of locations comprises a plurality of optical fibers which are bundled together at their one ends and are separated from each other at their other ends, each of the optical fibers having a refractive index distribution represented substantially by the following equation $$n = N(1 - ar^2),$$

where N represents the refractive index the center point thereof in a cross section of the fiber, n represents the refractive index at a radial distance $r$ from the center point, and $a$ is a positive constant, whereby plural images of one object field can be respectively produced at the separated end faces of the optical fibers.

6 Claims, 5 Drawing Figures

Patented Aug. 21, 1973  3,753,607

OPTICAL IMAGE TRANSMITTING STRUCTURE

This is a continuation of application Ser. No. 852,333 filed Aug. 22, 1969 and now abandoned.

BACKGROUND OF THE INVENTION

The present invention relates to an optical image transmitting device and more particularly to a device capable of transmitting an image of an object to a plurality of different places as respective plural images.

Heretofore, for the purpose of optical transmission of a plurality of images of one object to desired positions, combined use of reflectors, ordinary optical lenses, ordinary bundles of optical fibers and other optical elements has been necessary. However, these conventional devices have an inevitable drawback in that highly complex mechanisms are required and that they can only be fabricated at high expense.

SUMMARY OF THE INVENTION

It is accordingly a principal object of the present invention to provide an optical image transmitting device capable of transmitting a plurality of images of one object to plural separated positions without having the above-mentioned drawbacks of the conventional devices.

The above and other objects of the invention have been effectively attained by a device comprising a plurality of optical fibers which are bundled at their one side ends and separated at their other ends, each of said optical fibers having such a refractive index distribution as to nearby satisfy the equation $n = N(1 - ar^2)$, where N represents the refractive index at center point thereof in a cross section, $n$ represents the refractive index at a radial distance $r$ from said center point, and $a$ is a positive constant, whereby plural images of one object are produced at said separated end faces of said optical fibers by means of light projected from said object placed in front of said bundled end faces of said optical fibers.

The foregoing and other objects as well as the characteristic features of the invention will become more apparent and more readily understandable by the following description.

DETAILED DESCRIPTION OF THE INVENTION

When a gas is flowed in a laminar flow through a pipe from one end thereof to the other end and the wall of the pipe is heated, the gas in the pipe has such a refractive index distribution as to be decreased nearly in proportion with the square of a distance from a center axis of the pipe, with a result that the gas having a refractive index distribution as described above has an image forming capability like that of a convex lens. This phenomenon is known as the so-called principle of a gas lens, as is described, for instance, in pp. 180 - 187 of No. 3, Vol. 36, of "Oyo Butsuri (Applied Physics)." The present inventor has discovered that glass, synthetic resin and other fibrous transparent substances having the above described refractive index distribution can function as a lens.

Glass, synthetic resin and the like are most suitable materials of the optical fibers constituting the image transmitting structure of this invention. Especially, in the case of glass, a desired refractive index distribution can be easily obtained by progressively varying the refractive index in the interior of the glass by regulating the concentration of the cations composing the forming oxides of the glass at a constant and varying the concentration of at least two kinds of cations composing the modifying oxides of the glass. In the case of synthetic resin, on the other hand, the required refractive index distribution can be obtained by covering a resinous core structure with several kinds of synthetic resin having different refractive indexes and capable of being mutually diffused at a high temperature and thereafter applying heat thereto to obtain a consecutive variation in the refractive indexes of the resins.

The optical fibers constituting the image transmitting structure of the present invention function as a lens even if the refractive index distribution thereof roughly satisfies the above equation $n = N(1 - ar^2)$, if not exactly. Even when terms such as $r^4$ and $r^6$ are present in the brackets in the right member of said equation, the functioning of the optical fibers as a lens is not influenced if their coefficients are small.

Figure 1:
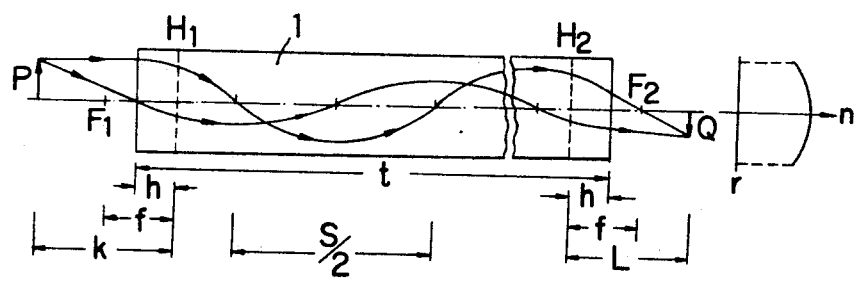
FIGS. 1 through 4 are schematic views for showing the principles of the present invention.

The relationship between an object and its image according to the optical fibers constituting the image transmitting structure of the present invention is plotted in FIG. 1, where a fibrous lens or optical fiber 1 has a radius R, length $t$, and refractive index distribution $n = N(1 - ar^2)$, where $ar^2 \ll 1$.

The focal distance $f$ of this fibrous transparent lens 1 can be obtained in the same way as the analysis applied to a medium having the above refractive index distribution which is described in pp. 465 - 467 of the thesis of Mr. H. Kogelnik carried in pp. 455 - 494 of the March, 1965, issue of the "Bell System Technical Journal," the U.S. technical magazine. That is, the focal distance $f$ can be obtained according to the following equation, when $(2a) = C$:

$$f = (Nc \sin Ct)^{-1} \quad (1)$$

However, the focal distance $f$ is represented by a distance measured toward a space on the side of an object from a first principal point of the lens or by a distance measured toward a space on the side of an image from a second principal point. The distance $h$ of a corresponding principal plane H as measured inwardly from the end faces of the lens, is represented by:

$$h = (Nc)^{-1} \tan \tfrac{1}{2} ct \quad (2)$$

In the drawing, $F_1$ and $F_2$ respectively designate the positions of focal points on the sides of the object and its image, while $H_1$ and $H_2$ represent, respectively, the principal planes on the sides of the object and its image.

When an object P is placed at a distance $k$ from the principal plane $H_1$ of the lens 1, an image Q is formed at a distance L from the principal plane $H_2$ on the side of the image of the lens. In this case, the following relation $$k^{-1} + L^{-1} = f^{-1}$$

is established between the distance $k$ of the object and the distance $L$ of the image when it is considered with respect to paraxial ray, in the same way as in an ordinary lens formula.

Figure 2:
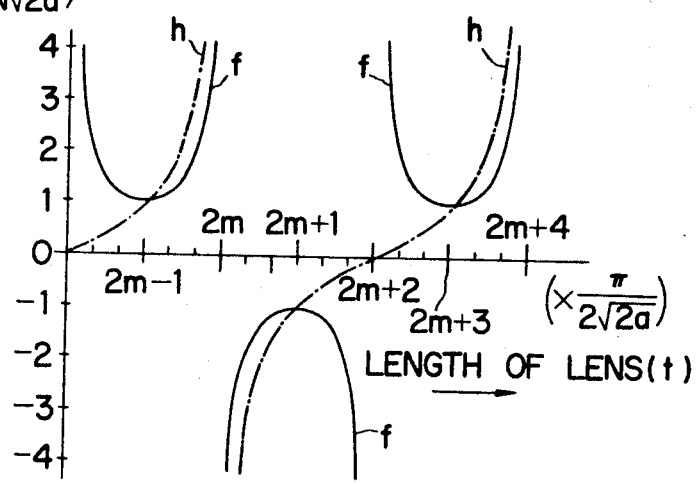

The above equations (1) and (2) representing, respectively, the focal distance $f$ and the principal plane distance $h$ are shown in FIG. 2 as functions of the length of the lens. The axis of abscissa in the graph plotted in FIG. 2 represents the length of the lens, while the axis of ordinate represents a focal distance and principal plane distance, and $m$ represents a positive integer. The full lines designate the focal distance $f$ and the chain lines represent the principal plane distance $h$. The focal distance is varied within a range between $(Nc)^{-1}$ and infinity, or $-(Nc)^{-1}$ and negative infinity, according to the length of the lens. As is clear from FIG. 2, the lens has a focal point outside itself at a portion where the full line $f$ is positioned higher than the chain line $h$, that is, when the length of the lens corresponds to a value from $(2c)^{-1}(2m-2)$ to $(2c)^{-1}(2m-1)$.

Light progresses through the interior of the transparent substance while oscillating around its center axis in the shape of a sine wave having its inherent wavelength $S$ equal to $2 c^{-1}$.

Figure 3:
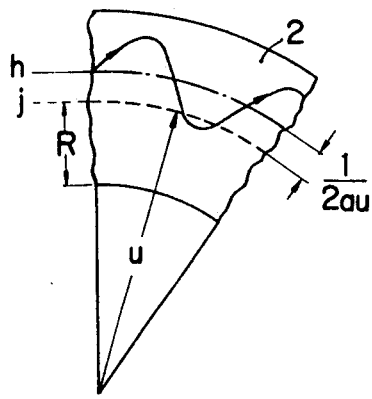
Figure 4:
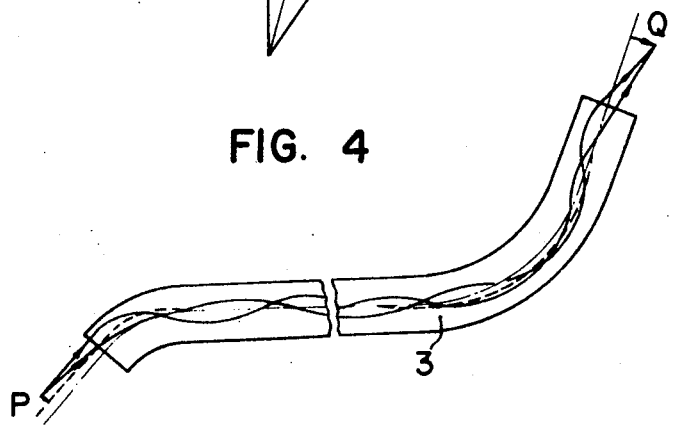

When the center axis of the transparent substance is curved in part, the optical axis, which is the oscillation center of the progressing light, is not in agreement with the center axis at the curved portion. If a certain part of the center axis is curved with a curvature radius of $u$, the optical axis at that part is deviated outwardly from the center axis by $(2au)^{-1}$. As is shown in FIG. 3, the optical axis $h$ is shifted from the center axis $j$ at the curved portion of the transparent substance 2. Therefore, when $(2au)^{-1}$ is sufficiently small as compared with the radical distance R from the center axis $j$ to the periphery of the transparent substance 2, the light-beams wander around the optical axis, whereby an image is transmitted. The brightness of the image is reduced when $(2au)^{-1}$ becomes larger, because the quantity of light colliding with the side surfaces of the transparent substance is increased. Accordingly, if the transparent substance is previously curved or even if the transparent substance is flexible and curved temporarily, the curvature does not exceeds a certain limit, the above described relationship between an object and its image is kept unchanged so far as the curvature does not exceeds a certain limit and the image transmission by the transparent substance is carried out. Of course, the optical axis at the curved portion is deviated from the center axis. This state is shown in FIG. 4, where the dotted line represents the optical axis deviated or shifted from the center axis thereof and an image of the object P is transmitted through the interior of the fibrous transparent substance 3 to form a real image Q.

However long the transparent substance may be, a light-beam which has once entered the transparent substance is transmitted therethrough without being scattered, because it is a lens system having a focal distance $f$ determined according to its length and principal planes $H_1$ and $H_2$.

The transparent substance can be fabricated, for instance, by the following process.

A bar of glass with a diameter of 1 mm and consisting of 56 wt percent of $SiO_2$, 14 wt percent of $Na_2O$, 20 wt percent of $Tl_2O$ and 10 wt percent of PbO was immersed in a bath of potassium nitrate at a temperature of 500° C for 24 hours, whereby a glass bar having a center refractive index N of 1.56, a surface refractive index of 1.53, and the distribution of internal refractive index $n$ nearly satisfying the equation $n = N(1 - ar^2)$, where $a = 7.7$ cm$^{-2}$ was obtained. This was cut and both ends thereof were ground at a right angle to its center axis, to obtain a glass bar with a length of 51.5 cm.

Figure 5:
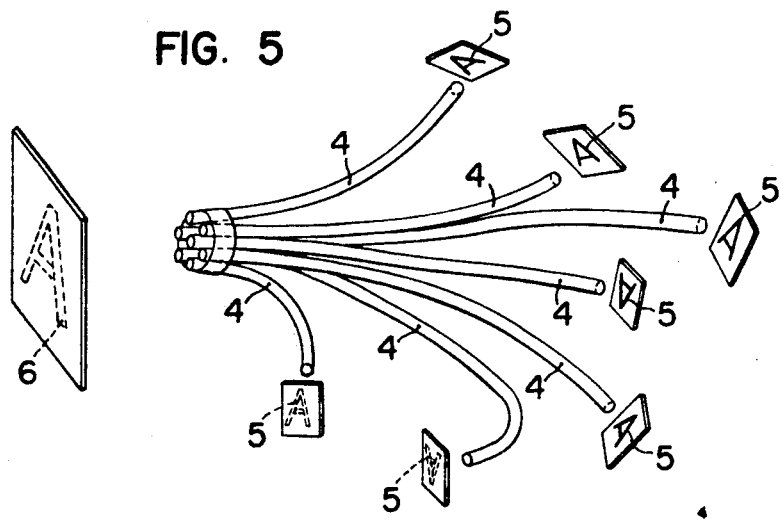
FIG. 5 illustrates schematically an embodiment of the invention.

In the image transmitting structure of the present invention, a plurality of such optical fibers as described above are arranged in such a manner that they are bundled together at one end thereof and separated from one another at the other end. Referring to FIG. 5, the optical fibers 4 constituting the image transmitting structure of the present invention have different lengths. An object field 6 to be transmitted is placed in front of one end face of the bundle of the optical fibers 4. Since the object 6 is placed within a range of an angle of the aperture corresponding to one end face of each optical fiber, the fibers transmit nearly the same image of the object to produce an image 5 at the other end face thereof. The position where the image 5 is formed can be selectively adjusted either by differentiating the lengths of the fibers or by bending them. The magnitude of the image as well as selection between erect and inverted images or between real and virtual images can be obtained at will by regulating the lengths of the fibers up to the limit of $\pi C^{-1}$ or by varying the distance between the object and the bundled end faces of the fibers.

When the position of the object 6 is brought closer to one end face of the optical fiber bundle, the images transmitted respectively through the optical fibers become somewhat different from one another and at the extreme case, when the object is brought into close contact with the end face of the bundle, the optical fibers transmit mutually different images each of which corresponds to that part of the object which is opposite to the end face of the respective optical fiber, whereby entirely different images are respectively formed at other separated end faces of the optical fibers.

We claim:

1. An optical image transmitting device comprising: means receptive of a plurality of optical images of a common object field for transmitting same to a plurality of separate locations, said means comprising a plurality of elongated optical fibers each having two end portions respectively terminating in a planar end face, each of said optical fibers having a refractive index distribution in each cross-sectional plane in substantial accordance with the equation $n = N(1-ar^2)$ wherein N represents the refractive index at the center of the optical fiber, $n$ represents the refractive index at a radial distance $r$ from the center of the optical fiber, and $a$ is a positive constant whereby each optical fiber has a light focusing effect, and means arranging one end portion of each of said optical fibers in a bundled together configuration wherein the planar end face of each of said one end portions is positioned to receive one of said optical images and arranging the other end portions of said optical fibers in transversely spaced-apart relationship wherein the planar end face of each of said other end portions is positioned to transmit the optical image to respective ones of a plurality of separate locations and focus the transmitted optical image at said location; and wherein an intermediate longitudinal portion of at least some of said optical fibers extends in a curved direction which has a radius of curvature $u$ selected in accordance with the expression $(2au)^{-1} < R$ wherein R represents the radial distance from the center to the periphery of the optical fiber.

2. An optical image transmitting device according to claim 1; wherein said optical fibers are composed of a flexible material thereby rendering said optical fibers flexible.

3. An optical image transmitting device according to claim 1; wherein at least some of said elongated optical fibers have a different length than others.

4. An optical image transmitting device according to claim 1; wherein all said planar end faces at the image receiving end of said bundled together configuration of optical fibers substantially lie in a common plane.

5. An optical image transmitting device according to claim 4; wherein all said planar end faces at the image transmitting end of said bundled together configuration of optical fibers lie in mutually different planes.

6. An optical image transmitting device according to claim 1; including an object field confronting the planar end faces of the bundled end of said plurality of optical fibers;

a plurality of screens each positioned at one of said separate locations in spaced confronting relationship from one of the other planar end faces of said plurality of optical fibers for receiving thereon in a focussed condition one of the transmitted optical images.

* * * * *